United States Patent
Walters et al.

[19]

[11] Patent Number: 5,895,184
[45] Date of Patent: Apr. 20, 1999

[54] HIGH PRECISION ADJUSTABLE STOP GAUGE ASSEMBLY

[75] Inventors: Jerome L. Walters, Bethel; John O. Greene, Blanchester, both of Ohio

[73] Assignee: Multifold International Corporation, Milford, Ohio

[21] Appl. No.: 08/798,976

[22] Filed: Feb. 11, 1997

[51] Int. Cl.⁶ .................................................. B23Q 3/10
[52] U.S. Cl. .................... 409/218; 33/642; 269/315; 408/103; 409/220
[58] Field of Search .................... 408/72 R, 103, 408/115 R, 241 R; 409/218, 220; 33/503, 628, 629, 630, 638, 640, 642; 269/303, 304, 306, 315

[56] References Cited

U.S. PATENT DOCUMENTS

| | | |
|---|---|---|
| 869,309 | 10/1907 | Kramer . |
| 1,026,072 | 5/1912 | Bostwick .................... 269/315 |
| 2,338,001 | 12/1943 | Vigne . |
| 2,850,058 | 9/1958 | Stoll . |
| 3,810,311 | 5/1974 | Pingel . |
| 3,827,686 | 8/1974 | Storkh . |
| 4,020,742 | 5/1977 | Raymond . |
| 4,030,718 | 6/1977 | Philipoff . |
| 4,055,070 | 10/1977 | Wingate et al. . |
| 4,275,872 | 6/1981 | Mullis . |
| 4,322,066 | 3/1982 | Disney . |
| 4,583,391 | 4/1986 | Stafford . |
| 4,598,480 | 7/1986 | Cukelj . |
| 4,667,945 | 5/1987 | Thro . |
| 5,040,443 | 8/1991 | Price . |
| 5,197,721 | 3/1993 | Ruberg . |
| 5,337,641 | 8/1994 | Duginske . |

FOREIGN PATENT DOCUMENTS

| 21448 | 9/1920 | France .................... 269/315 |
|---|---|---|

*Primary Examiner*—Daniel W. Howell
*Attorney, Agent, or Firm*—Killworth, Gottman, Hagan & Schaeff, LLP

[57] ABSTRACT

The present invention is directed to a positioning apparatus which is used to position work pieces in a work piece securing mechanism during a computer controlled machining operation. The apparatus includes an arm which is slidably mounted on a graduated shaft so that the position of the arm from a zero reference point can be determined. The apparatus may also include a second graduated shaft slidably mounted in the arm so that the position of a work piece inside a work piece securing mechanism can be determined in relation to a zero reference point. The apparatus of this invention can repeatedly position work pieces within about 0.0005 inch (0.0013 cm) of a desired position, or better.

20 Claims, 3 Drawing Sheets

5,895,184

1

HIGH PRECISION ADJUSTABLE STOP GAUGE ASSEMBLY

FIELD OF THE INVENTION

The present invention generally relates to devices used to position a work piece for a precision machining operation and particularly to a positioning device used to position a work piece in a computer controlled high precision machining operation.

BACKGROUND OF THE INVENTION

In a machining operation such as, for example, cutting, drilling, milling, shearing, etc., it is frequently necessary to machine a large number of similar or different work pieces. A work piece is typically held during the machining operation by a work piece positioning device such as, for example, a vice with a pair of opposing gripping jaws. For such operations, each work piece is positioned at a desired location in relation to the machining device to ensure that each work piece is machined properly. The same work pieces are typically positioned at the same location. When the machining process is computer controlled, the computer often controls the machining of each work piece relative to a zero reference point programmed into the computer controls.

The prior art includes various stop gauge assemblies, each having a stop surface against which a work piece is positioned in order to locate the work piece for machining. For example, U.S. Pat. No. 5,197,721 to Ruberg discloses a device attachable to a milling machine vise for positioning a work piece between a pair of vise jaws. The device described in the Ruberg patent includes a bar clamped to a top surface of a vise and an intermediate member connected to the end of the bar. The intermediate member has a leading end mounting a work piece contacting rod. The contacting rod has a contact or stop surface and is adjustable so as to secure its stop surface at a desired location, relative to the machining device. The work piece is positioned against the stop surface, gripped in the vise jaws and then machined. If the work pieces are relatively identical, once the position of the stop surface is set, all of the work pieces can be machined similarly with a high degree of consistency between the work pieces. If the work piece changes, then the position of the stop surface typically needs to be repositioned.

One problem with the device described in the Ruberg patent is that the contacting rod, and therefore the stop surface, cannot be positioned at a desired location and repositioned to a different location with a high degree of precision. The inability to position the stop surface of the Ruberg device, and therefore the work piece, with a high degree of precision makes it more difficult and time consuming, if not impossible, to machine a work piece with a high degree of precision, in particular by computer control.

Accordingly, there is a need for a stop gauge assembly which can position a work piece to a desired location and reposition the work piece to a different location with a high degree of precision.

SUMMARY OF THE INVENTION

The present invention provides an apparatus including a stop gauge assembly which can be used to repeatedly and accurately position the same, similar or different work pieces in relation to a zero reference point in a computer controlled machining apparatus and process. The stop gauge of the present invention can be detachably mounted on a work piece securing mechanism and can also be used with a manual operation.

In one aspect of the present invention, an apparatus for machining a work piece is provided which includes a machining mechanism for machining a work piece, a computer controller for controlling the machining mechanism, a work piece securing mechanism, and a work piece positioning apparatus. The computer controller is operatively adapted to control the machining of the work piece relative to a zero reference point programmed into the controller.

The positioning apparatus includes a first shaft mounted to the work piece securing mechanism. The first shaft has a plurality of first graduation marks and a plurality of first openings formed along at least a portion of its length. Each of the first openings corresponds to a position indicated on the shaft by one of the first graduation marks. The positioning apparatus also includes an arm which is mounted to be movable along and extend out from the first shaft. The arm has a stop surface against which a work piece is to be positioned. A first positioning element is operatively adapted with a first protuberance that is insertable into one of the first openings for maintaining the arm at a position on the first shaft indicated by one of the first graduation marks.

It is desirable for the first shaft to be mounted to the work piece securing mechanism so that there is a distance between the zero reference point and each of the first graduation marks that is indicated by one of the first graduation marks. The stop surface can be positioned a desired distance from the zero reference point by moving the arm to a position on the first shaft, indicated by a first graduation mark corresponding to the desired distance for the stop surface. The first protuberance is then inserted into the corresponding first opening to maintain the position of the arm.

The positioning apparatus may further include a second shaft. The second shaft is mounted so as to be extendable out from the arm and mounts the stop surface. The second shaft has a plurality of second graduation marks and a plurality of second openings formed along a length thereof. Each of the second openings corresponds to a position indicated on the second shaft by one of the second graduation marks. To position the second shaft in relation to the arm, this positioning apparatus also includes a second positioning element operatively adapted with a second protuberance which is insertable into one of the second openings to maintain the stop surface at a desired distance out from the arm.

The stop surface of this alternative positioning apparatus can be positioned a desired distance from the zero reference point by extending the second shaft out from the arm a distance indicated by a second graduation mark corresponding to the desired distance for the stop surface. The second protuberance is then inserted into the corresponding second opening to maintain the position of the second shaft.

In another aspect of the present invention, an apparatus for positioning a work piece in a work piece securing mechanism is provided. The positioning apparatus comprises a first shaft mountable to a work piece securing mechanism. The shaft has a plurality of first graduation marks and a plurality of first openings formed along a length thereof. Each of the first openings corresponds to a position indicated on the first shaft by one of the graduation marks. The positioning apparatus also includes an arm mounted so as to be movable along and extend out from the first shaft. The arm has a stop surface against which a work piece is to be positioned. A first positioning element is operatively adapted with a protuberance that is insertable into one of the first openings for maintaining the arm at a position on the first shaft indicated by one of the graduation marks.

In an alternate version of this positioning apparatus, the positioning apparatus includes a second shaft. The second shaft is mounted so as to be extendable out from the arm and has a plurality of second graduation marks and a plurality of second openings formed along a length thereof. Each of the second openings corresponds to a position indicated on the second shaft by one of the graduation marks. A second positioning element is operatively adapted with a second protuberance insertable into one of the second openings on the second shaft for maintaining the stop surface at a desired distance out from the arm.

The stop surface of this alternate positioning apparatus can be positioned a desired distance out from the arm by extending the second shaft out from the arm a distance indicated by a second graduation mark corresponding to the desired distance for the stop surface, and inserting the second protuberance into the corresponding second opening to maintain the position of the second shaft.

The present invention provides for consistent and accurate positioning of work pieces in a work piece securing mechanism in either a manual or computer controlled operation.

DETAILED DESCRIPTION

Although the present invention is herein described in terms of specific embodiments, it will be readily apparent to those skilled in this art that various modifications, rearrangements, and substitutions can be made without departing from the spirit of the invention. The scope of the present invention is thus only limited by the claims appended hereto.

The present invention is directed to a positioning apparatus used to position a work piece in a work piece securing mechanism for both automated and manual machining operations. The present invention is particularly useful with a computer controlled machining operation in which the computer controller requires a zero reference point to determine the point on the work piece where the machining operation will be carried out.

Figure 1:
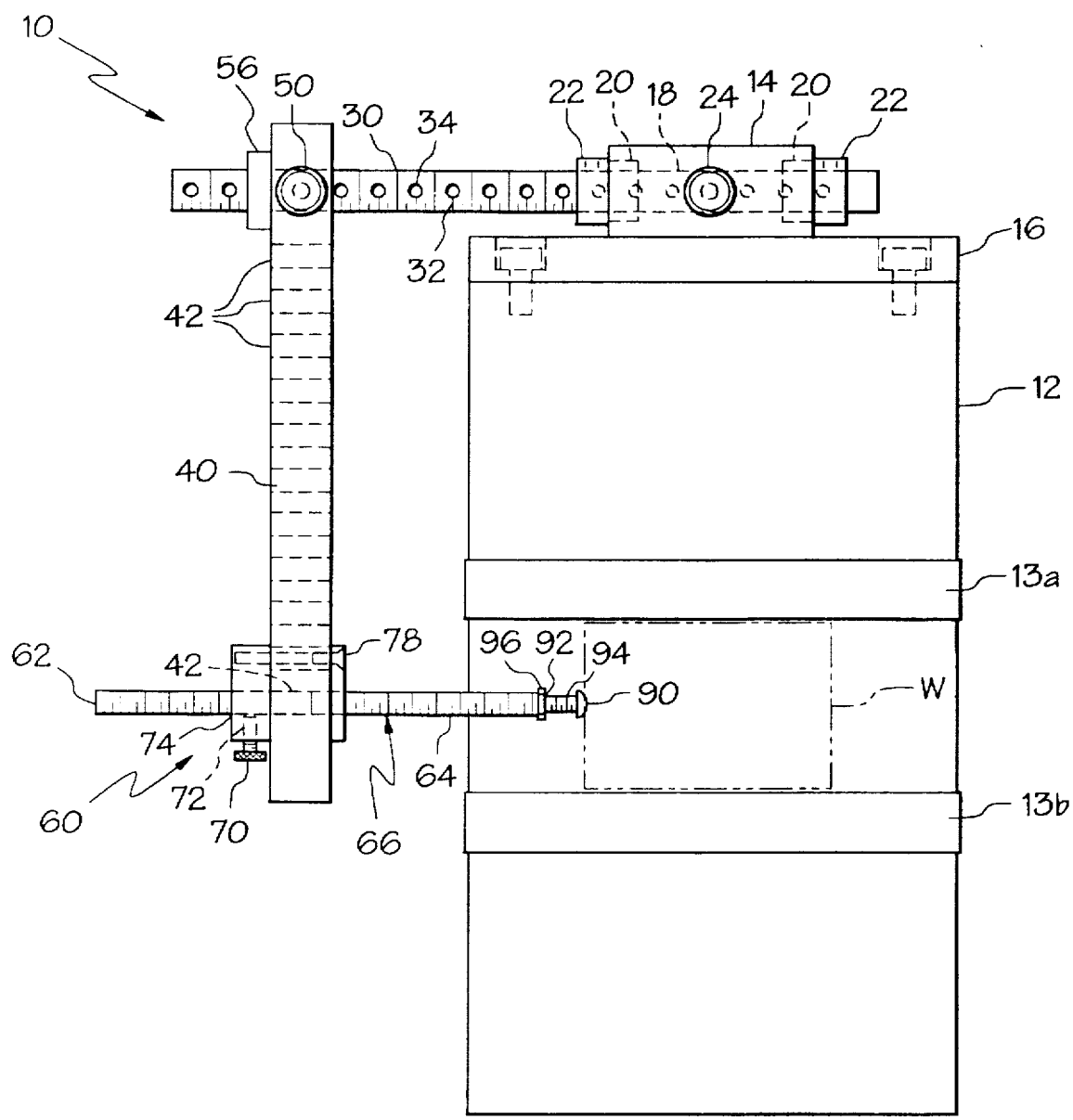
FIG. 1 presents a top plan view of one embodiment of the positioning apparatus of the present invention.

Referring to FIG. 1, one embodiment of a positioning apparatus 10 according to the present invention is detachably mounted on a suitable work piece securing mechanism 12 such as, for example, a vise with a fixed jaw 13a and a movable jaw 13b. Positioning apparatus 10 comprises a mount 14, a first graduated shaft 30, a stop arm 40, and a stop mechanism 60. A work piece W is shown in phantom lines. First graduated shaft 30 is slidably mounted in mount 14. Stop arm 40 is slidably mounted on shaft 30.

Figure 2:
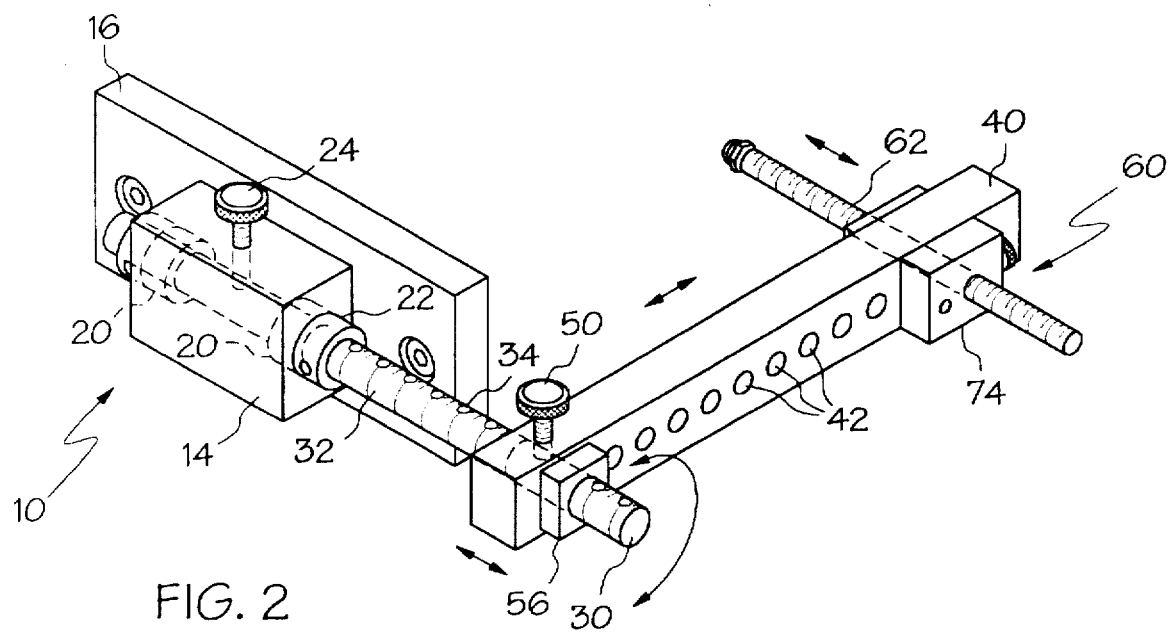
FIG. 2 presents a back side perspective view of the positioning apparatus of FIG. 1, not attached to a work piece securing mechanism.

As shown in FIG. 2, mount 14 includes a mounting plate 16, two bushings 20, two collars 22 with set screws, and a locking bolt 24. Mounting plate 16 is detachably mounted on the back side of vise 12, for example, with bolts. Mount 14 includes a longitudinal through hole or aperture 18 in which the bushings are mounted with the first graduated shaft 30 being disposed therethrough. Collars 22 are slidably mounted on first graduated shaft 30, one at each end of the aperture 18. Once set in place, collars 22 prevent shaft 30 from moving longitudinally through the aperture 18. Bushings 20 facilitate rotation of the shaft 30 about its longitudinal axis. Locking bolt 24 is threaded into a hole formed through to the aperture 18 and is tightenable so as to contact and prevent shaft 30 from rotating in bushings 20.

First graduated shaft 30 includes a plurality of first graduation marks 32 and first openings 34 formed along the length of shaft 30. First graduation marks 32 are positioned at known distances along the shaft 30, with a high degree of accuracy, so that the position of stop arm 40, and a stop surface 90 on stop arm 40, may be determined relative to a zero reference point with a high degree of precision, as will be discussed in detail below. First graduation marks 32 can be made in any system of measurement including English units, metric units or both. First openings 34 formed on shaft 30 are positioned such that each opening 34 corresponds to a graduation mark 32. For example, with the shaft 30 marked off in increments of 0.25 inch, four openings 34 could be provided for each inch of shaft 30, with the center of each opening 34 being located at a 0.25 inch graduation mark 32 (see FIG. 3). As another example, the shaft 30 could be marked off in increments of 0.125 inch and an opening 34 located with its center at 0.5 inch intervals (see FIG. 1). It is important for whatever increments are used to be accurate, in order to help in accurately positioning the stop surface a known distance from the zero reference point.

A plurality of through holes or apertures 42 are formed along the length of the stop arm 40. First graduated shaft 30 is disposed through one of the apertures 42 so as to mount the arm 40 thereon as desired. A first positioning element 50 such as, for example, a bolt or screw is threaded into a threaded hole formed through arm 40 to the aperture 42 containing the shaft 30. It is desirable for the bolt or screw 50 to be hand tightenable. The threaded bolt 50 has a leading end or other first protuberance 52. The bolt 50 is tightenable so as to extend into one of the first openings 34 in shaft 30. In this way the arm 40 can be locked into position at a desired known location along the shaft 30. First positioning element 50 can be a variety of items, other than a bolt or screw such as, for example, a spring pin or a lynch pin, as long as the positioning element 50 is operatively adapted with a first protuberance 52 to engage a first opening 34. An optional reinforcement block 56 can be attached to arm 40 to eliminate, or at least significantly reduce, any deflection which may occur during the translation of arm 40 along shaft 30.

The stop mechanism 60 comprises a second graduated shaft 62. Second graduated shaft 62 is disposed through a mounting through hole or aperture 42 formed in the extending end of the arm 40. Like the first shaft 30, the second graduated shaft 62 includes a plurality of second graduation marks 64 and second openings 66 along a length thereof. Second graduation marks 64 can be in any system of measurement including English units, metric units or both. Each of the second openings 66 is positioned on the shaft 62 so as to correspond to a graduation mark 64, as described above for the first shaft 30. A stop surface 90 is formed at the one end of the second shaft 62.

The stop mechanism 60 also includes a second positioning element 70 such as, for example, a hand tightenable bolt or screw. Second positioning element 70 is mounted in a mounting block 74 which is adjustably secured to arm 40. Mounting block 74 is adjustably secured to arm 40, for example, by a fastener plate and screw combination 78. Second positioning element 70 extends through an aperture 76 in mounting block 74 and engages openings 66 on shaft 62 to variably position arm 40 in relation to a work piece W positioned inside of vise 12. Like element 50, second positioning element 70 can be a variety of items, other than a bolt or screw such as, for example, a spring pin or a lynch pin, as long as the positioning element 70 is operatively adapted with a protuberance 72 to engage one of the openings 66.

In an optional embodiment, stop surface 90 can be adjustably mounted to the leading end of graduated shaft 62, for example, by using the head of a bolt, or other threaded body 94, for the stop surface 90 and threading the shank 94 of the bolt into a threaded hole 92 formed in the leading end of the shaft 62. To ensure that proper positioning of the stop surface 90 can be maintained, a lock nut 96 is mounted on the threaded body 94 to prevent movement of stop surface 90 once it has been adjusted to the desired position.

Figure 3:
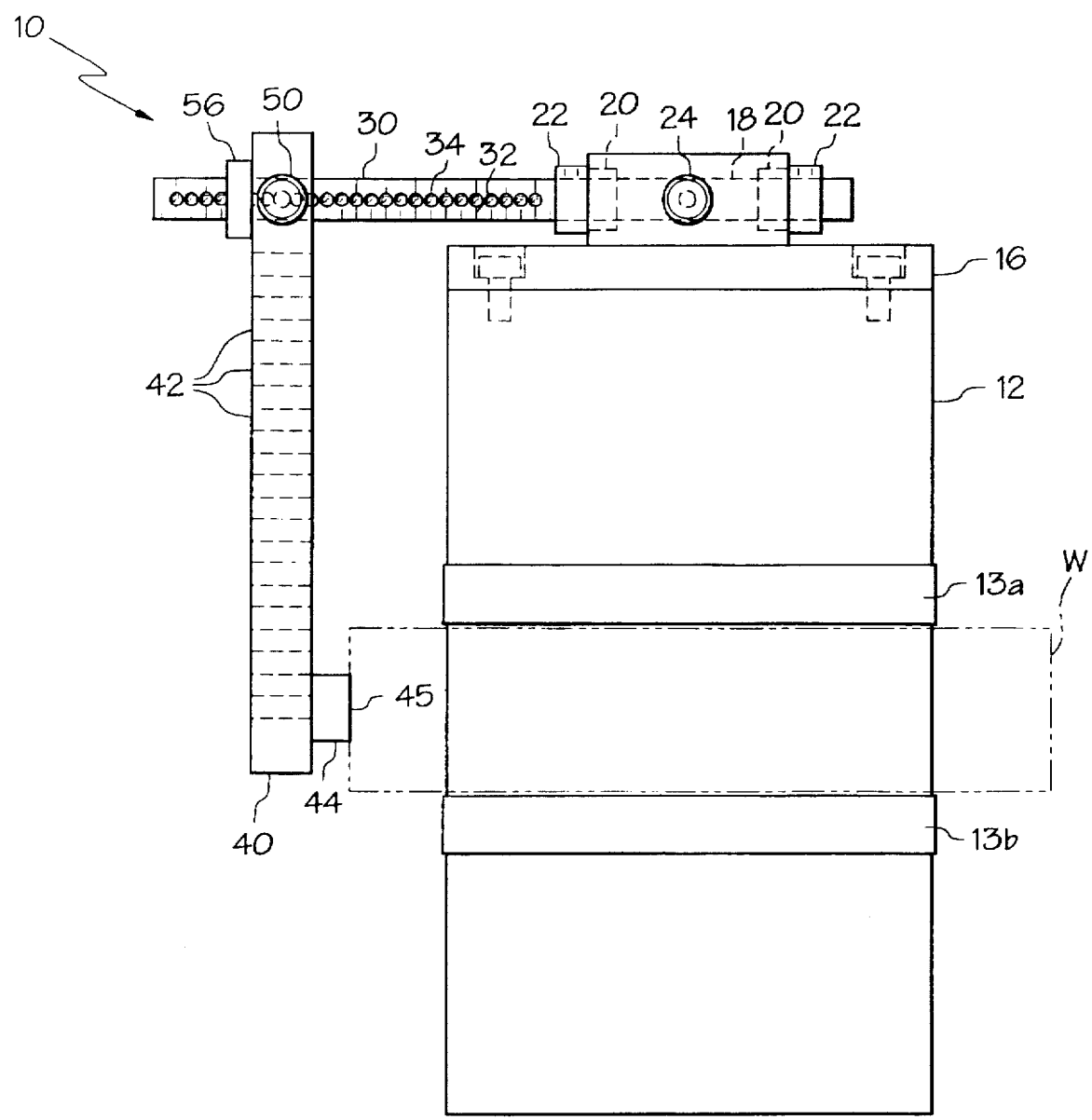
FIG. 3 presents a top plan view of an alternate embodiment of the positioning apparatus of the present invention.

As shown in FIG. 3, instead of stop mechanism 60, an alternate embodiment of the positioning apparatus 10 includes a stop block 44 with a stop surface 45 for positioning work pieces W which extend out beyond the left side of the vise 12 (i.e., the chosen zero reference point). Stop block 44 is detachably mounted on arm 40 by a bolt, screw or other suitable fastener. It is desirable for stop block 44, as well as the stop mechanism 60, to be mounted in one of the mounting apertures 42 so that its corresponding stop surface 45 can be adjustably positioned along arm 40, to enable the apparatus 10 to be used with different size work piece securing mechanisms 12 and to accommodate different size work pieces. Stop block 44 is shown as having a rectangular prism shape; however, stop block 44 may have any shape which is useful with the present invention. It is desirable for stop block 44 to have the shape of a rectangular pyramid.

To adjust the positioning of stop surface 45 on arm 40, the bolt or screw is removed from the corresponding aperture 42. Stop block 44 is then moved to the desired position and the screw is inserted into the appropriate mounting aperture 42. Second shaft 62 may also be adjustably positioned on arm 40. When second shaft 62 is used, shaft 62 is moved to the desired position along arm 40 and inserted into the desired mounting aperture 42. Mounting block 74 is then moved to the same position and fastener 78 is then used to secure stop mechanism 60 in position.

As shown in FIG. 2, shaft 30 and arm 40 can be moved angularly about the central longitudinal axis of shaft 30 to provide for proper positioning of the stop surface 45 or 90 and a work piece W in vise 12. The process by which arm 40 is moved angularly will now be discussed. Shaft 30 is mounted in aperture 18 of mount 14 to allow shaft 30 to be rotated about its central longitudinal axis and consequently arm 40 to be moved angularly to, for example, position work pieces W of differing sizes. Arm 40 can also be rotated to a position at which it does not interfere with the initial positioning of a work piece W in vise 12. To rotate shaft 30 and move arm 40 angularly, locking bolt 24 on mounting plate 16 is loosened. Shaft 30 can then be rotated in bushings 20 to the desired point. Once shaft 30 has been rotated and arm 40 has been moved angularly into the desired position, locking bolt 24 is tightened to prevent further movement of shaft 30.

The positioning apparatus 10 of the present invention can be used in combination with a computer controlled machining operation. Typically, these operations include the use of a conventional machining mechanism for machining a work piece W, a computer controller for controlling the machining mechanism and a work piece securing mechanism, such as vise 12. The computer controller is programmed to control the machining of the work piece W relative to a "zero reference point" to ensure that successive work pieces W are properly machined. The computer controller calculates the positioning of the particular operation to be performed on the work piece W based on the zero reference point. Each work piece W must be repeatedly and consistently positioned relative to the zero reference point so that the process being performed on the work piece W, whether it be cutting, drilling, milling, shearing or any other machining operation, will be carried out at the same position on successive work pieces W. Typically, the zero reference point is arbitrarily chosen to be a point on the edge of the work piece securing mechanism closest to a fixed securing member of the work piece securing mechanism such as, for example, a side edge of the fixed jaw 13a of the vise 12.

Positioning apparatus 10 is used to accurately and precisely position work piece W in vise 12. Before positioning work piece W in the vise 12, positioning apparatus 10 must first be aligned with the zero reference point which, for the purposes of this detailed description, will be the left side edge of the fixed jaw 13a of vise 12, i.e., the edge closest to the arm 40 of positioning apparatus 10. If the work piece W extends beyond the left side edge of vise 12, then it is not necessary to use the stop mechanism 60 with its second graduated shaft 62 (see FIG. 2). However, if the work piece W is positioned within the jaws 13a and 13b, then second graduated shaft 62 is used (see FIG. 1).

To align positioning apparatus 10 with the zero reference point, graduated shaft 30 is movable in mount 14. To move graduated shaft 30 in mount 14, collars 22 which are slidably mounted on shaft 30 on each side of mounting plate 16 are loosened so that shaft 30 slides freely in bushings 20 and longitudinal aperture 18. Shaft 30 is then adjusted to align a zero graduation mark 32 with the zero reference point, which is usually the left side edge of vise 12. Once the zero graduation mark 32 has been aligned with the zero reference point, collars 22 are tightened to secure shaft 30 in position in bushings 20 in mounting plate 16 so that shaft 30 is prevented from moving longitudinally.

The zero graduation mark 32 may be aligned with the zero reference point in several ways. The operator may use a common machinist's edge finder, such as that manufactured by Starrett of Athol, Massachusetts under the product designation edge finder. Alternately, the operator may use a common machinist's indicator and gauge block. A useful indicator is manufactured by Starrett of Athol, Massachusetts under the product designation test indicator. A useful gauge block is manufactured by Brown & Sharp of Providence, Rhode Island under the product designation gauge block.

The zero graduation mark 32 may also be aligned with the zero reference point by means of arm 40. To use arm 40 to adjust first shaft 30 so that zero graduation mark 32 aligns with the zero reference point, shaft 30 must be moved in mounting block 14 so that the zero graduation mark 32 is moved beyond (in this example, to the left) the approximate position of the zero reference point. Arm 40 is moved so that its edge is aligned with the zero graduation mark 32. Arm 40 is then secured in position by means of positioning element 50 which engages a corresponding first opening 34 on first shaft 30. First shaft 30 is then moved so that arm 40 abuts against the left side edge of the fixed jaw 13a of vise 12. The zero graduation mark 32 is now aligned with the zero reference point. Shaft 30 is secured in position in mounting block 14 as described above and arm 40 can be moved along shaft 30 to a desired position.

After the zero graduation mark 32 has been aligned with the zero reference point, stop arm 40 is positioned a desired distance from the zero reference point. To position stop arm 40, stop arm 40 is moved along graduated shaft 30. To move stop arm 40, positioning element 50 is disengaged from whatever opening 34 with which it was engaged. Stop arm 40 is moved a desired distance from the zero reference point as determined by reading the graduation mark 32 which aligns with the edge of arm 40 facing the vise 12 (i.e., the right side edge of arm 40). Once stop arm 40 has been moved to the desired distance from the zero reference point, positioning element 50 is engaged with an opening 34 which corresponds to the graduation mark 32 which indicates the distance of stop arm 40 from the zero reference point.

For the apparatus 10 of FIG. 1, once stop arm 40 has been positioned a desired distance away from the zero reference point, second arm 62 of stop mechanism 60 is moved so that each of a plurality of work pieces W can be consistently and accurately positioned inside vise 12. As stated above, positioning apparatus 60 is used when a work piece W does not extend out of vise 12 beyond the zero reference point. Second graduated shaft 62 of stop mechanism 60 is positioned in the following manner. Second positioning element 70 is removed from contact with shaft 62. Shaft 62 is then moved until stop surface 90 extends the desired distance between the jaws 13a and 13b of vise 12. To determine the length by which shaft 62 extends from arm 40, the graduation mark 64 which is positioned at the right side edge of arm 40 is read. Once shaft 62 has been extended the desired distance into vise 12, second positioning element 70 is moved so that it engages an opening 66 on shaft 62.

The position of the work piece W from the zero reference point is determined by subtracting the distance between the zero reference point and the arm 40, as indicated by the graduation marks 32 on shaft 30, from the distance shaft 62 extends into vise 12, as indicated by the graduation marks 64 on shaft 62. The work piece W is then positioned in vise 12 against the stop surface 90. Finally, the distance from the zero reference point to the work piece W is then inputted into the computer control device and the machining operation is begun.

When stop surface 90 is adjustably mounted in shaft 62, as indicated above, threaded shank 94 can be rotated in a first direction to extend stop surface 90 further out from shaft 62 and in a second direction to move it in toward shaft 62. Once stop surface 90 has been adjusted in relation to shaft 62, it is retained in position by lock nut 96. If the location of the stop surface 90 is adjusted in this manner, then the length that stop surface 90 extends from shaft 62 is added to the calculation of the position of the work piece W from the zero reference point.

To position stop surface 45 a desired distance from the zero reference point, arm 40 is moved as described above.

However, arm 40 is moved a distance which equals the desired distance from the zero reference point plus the width of stop block 44 so that its stop surface 45 is positioned the desired distance from the zero reference point. For example, if stop block 44 has a width of 0.25 inch (0.64 cm) and the desired distance for stop surface from the zero reference point is 4 inches (10.16 cm), then stop arm 40 is moved to a position 4.25 inches (10.8 cm) from the zero reference point so that the work piece W will be properly positioned.

Figure 4:
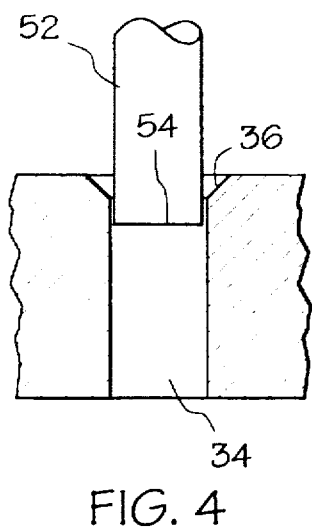
FIG. 4 presents a cross sectional view of a graduated shaft of a positioning apparatus according to the present invention with a countersunk through-hole opening being engaged by a positioning element having a flat end.
Figure 5:
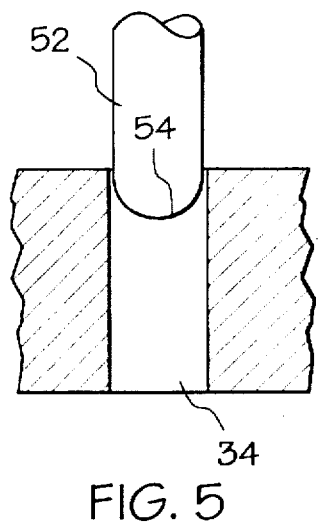
FIG. 5 presents a cross sectional view of an alternate graduated shaft with a straight through-hole opening being engaged by an alternate positioning element having a rounded end.
Figure 6:
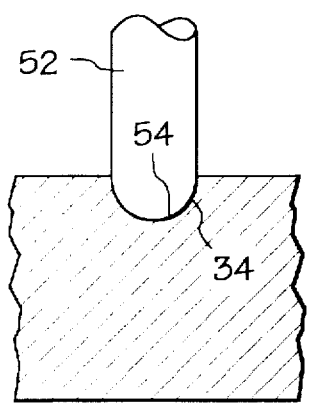
FIG. 6 presents a cross sectional view of another graduated shaft with a dimple shaped opening being engaged by the positioning element of FIG. 5.

By being provided with their corresponding protuberance 52 or 72, the positioning elements 50 and 70 can each be accurately positioned in openings 34 and 66, respectively. Second positioning element 70 can engage openings 66 in the same manner as first positioning element 50 engages openings 34 on shaft 30. Examples of various embodiments of protuberances 52 and openings 34 are shown in FIGS. 4–6. It is understood that these embodiments are equally applicable for the protuberance 72 and openings 66 associated with the positioning element 70.

Referring to FIG. 4, each protuberance 52 can have a flat blunt tip 54 and each opening 34 can be a countersunk hole with a beveled surface 36. As the flat blunt tip 54 of protuberance 52 engages surface 36, protuberance 52 is biased toward the center of opening 34 by the bevelled surface 36 causing tip 54 to be seated in the center of opening 34.

Referring to FIG. 5, protuberance 52 of positioning element 50 can also have a rounded tip 54 and the opening 34 can be a through hole without a beveled entrance opening. The rounded tip 54 of protuberance 52 eliminates the need for a beveled surface 36 around the entrance to opening 34 to facilitate seating of the protuberance 52 in position in opening 34. Even when protuberance 52 has a rounded tip 54, it may still be desirable for the opening 34 to have a bevelled surface 36 as shown in FIG. 4.

Referring to FIG. 6, the protuberance 52 can have a rounded tip 54 and the opening 34 can be a blind hole with a hemispherical-type dimple shape sized to receive the rounded tip 54. By providing protuberance 52 with a rounded tip 54 and constructing opening 34 in the form of a dimple, errors related to the improper positioning of the element 50 in the opening 34 is significantly reduced, if not eliminated. Satisfactory results have been obtained when positioning elements 50 and 70 are each a thumb screw having a protuberance with a rounded tip.

It has been found desirable for shaft 30 to have a diameter in the range of from about 0.5 to about 1 inch and a length in the range of from about 4 to about 10 inches, with openings 34 being placed at 0.25 inch intervals. It has also been found desirable for second shaft 62 to typically be about 0.375 inch in diameter and to be in the range of from about 4 to about 8 inches in length. One skilled in the art will appreciate that the dimensions of the various parts can be altered without affecting the performance of the apparatus of the present invention.

The various components of this positioning apparatus are machined to a degree of precision which enables repeatable positioning having a total error of ±0.0005 inch (0.0013 cm). To permit such accurate machining, first shaft 30, arm 40 and second shaft 62 are desirably machined from a suitable high strength steel.

The machining mechanism useful with the positioning apparatus 10 can be any machining mechanism currently in use in the art. Machining operations performed by such mechanisms include cutting, drilling, milling and shearing. Other operations requiring repeated, accurate positioning of work pieces W are also possible with the positioning apparatus of the present invention. For example, the present invention is useful with a HURCO BMC 30 HT computerized numerical machining center available from Hurco located in Indianapolis, Ind.

The work piece securing mechanism or vise 12 useful with this invention can be any work piece securing mechanism or vise 12 currently in use in the art. For example, the positioning apparatus 10 can be used in connection with a work piece securing mechanism such as a Model 3620V short vise available from Kurt Manufacturing located in Minneapolis, Minn. The function and operation of such devices are known to a person skilled in the art.

The positioning apparatus 10 does not have to be adjusted to accommodate differently sized work pieces W once shaft 30 has been aligned with the zero reference point. On the other hand, prior art stop gauges must be adjusted as differently sized work pieces W are placed in vise 12. The prior art method is both time consuming and expensive because productive worker time is spent adjusting the positioning apparatus. The present invention can save one hour or more per day per machining device. This translates to a savings of approximately 250 worker hours or more per year per each machining device. Thus, the present invention can substantially reduce the amount of time necessary to position a work piece W in a work piece securing mechanism.

While certain representative embodiments and details have been shown for the purpose of illustrating the invention, it will be apparent to those skilled in the art that various modifications, rearrangements and substitutions can be made to the apparatus described herein without departing from the scope of the invention, which is defined in the appended claims.

What is claimed is:

1. An apparatus for machining a work piece, said apparatus comprising:

a machining mechanism for machining a work piece;

a computer controller for controlling said machining mechanism, said controller being operatively adapted to control the machining of the work piece relative to a zero reference point programmed in said controller;

a work piece securing mechanism; and a positioning apparatus comprising:

a first shaft mounted to said work piece securing mechanism, said first shaft having a plurality of first graduation marks and a plurality of first openings formed along a length thereof, each of said first openings corresponding to a position indicated on said first shaft by one of said first graduation marks, an arm mounted so as to be movable along and extend out from said first shaft, said arm including a stop surface against which a work piece is to be positioned, and a first positioning element operatively adapted with a first protuberance insertable into one of said first openings for maintaining said arm at a position on said first shaft indicated by one of said first graduation marks.

2. The apparatus of claim 1, wherein said first shaft is mounted to said work piece securing mechanism so that there is a distance between said zero reference point and each of said first graduation marks that is indicated by one of said first graduation marks.

3. The apparatus of claim 2, wherein said stop surface is positioned a desired distance from said zero reference point by moving said arm to a position on said first shaft, indicated by a first graduation mark corresponding to the desired distance for said stop surface, and inserting said first protuberance into the corresponding first opening to maintain the position of said arm.

4. The apparatus of claim 1, said apparatus further comprising:

a second shaft mounted so as to be extendable out from said arm and mounting said stop surface, said second shaft having a plurality of second graduation marks and a plurality of second openings formed along a length thereof, each of said second openings corresponding to a position indicated on said second shaft by one of said second graduation marks; and a second positioning element operatively adapted with a second protuberance insertable into one of said second openings for maintaining said stop surface at a desired distance out from said arm.

5. The apparatus of claim 4, wherein said stop surface is positioned a desired distance from said zero reference point by extending said second shaft out from said arm a distance indicated by a second graduation mark corresponding to the desired distance for said stop surface, and inserting said second protuberance into a corresponding second opening to maintain the position of said second shaft.

6. The apparatus of claim 4, wherein said stop surface is adjustably mounted so as to be extendable from said second shaft.

7. The apparatus of claim 1, wherein said stop surface is mountable at more than one location along said arm.

8. The apparatus of claim 1, wherein said first protuberance has a rounded leading end insertable into one of said first openings.

9. The apparatus of claim 8, wherein each of said first openings is defined by a hemispherical-type dimple formed in said first shaft.

10. The apparatus of claim 1, wherein said first protuberance and said first openings are formed with sufficient precision to enable said stop surface to be repeatedly positioned within about 0.0005 inch of a desired distance from said zero reference point.

11. An apparatus for positioning a work piece in a work piece securing mechanism, the apparatus comprising:

a first shaft mountable to a work piece securing mechanism, said first shaft having a plurality of first graduation marks and a plurality of first openings formed along a length thereof, each of said first openings corresponding to a position indicated on said first shaft by one of said first graduation marks;

an arm mounted so as to be movable along and extend out from said first shaft, said arm including a stop surface against which a work piece is to be positioned; and a first positioning element operatively adapted with a first protuberance insertable into one of said first openings for maintaining said arm at a position on said first shaft indicated by one of said first graduation marks, wherein said stop surface is positioned a desired distance from a zero reference point by moving said arm to a position on said shaft, indicated by a graduation mark corresponding to the desired distance, and inserting said protuberance into the corresponding first opening to maintain the position of said arm.

12. The apparatus of claim 11, said apparatus further comprising:

a second shaft mounted so as to be extendable out from said arm and mounting said stop surface, said second shaft having a plurality of second graduation marks and a plurality of second openings formed along a length thereof, each of said second openings corresponding to a position indicated on said second shaft by one of said second graduation marks; and a second positioning element operatively adapted with a second protuberance insertable into one of said second openings for maintaining said stop surface at a desired distance out from said arm.

13. The apparatus of claim 12, wherein said stop surface is positioned a desired distance out from said arm by extending said second shaft out from said arm a distance indicated by a second graduation mark corresponding to the desired distance for said stop surface, and inserting said second protuberance into a corresponding second opening to maintain the position of said second shaft.

14. The apparatus of claim 12, wherein said stop surface is adjustably mounted so as to be extendable from said second shaft.

15. The apparatus of claim 12, wherein said first and second protuberances and said first and second openings are formed with sufficient precision to enable said stop surface to be repeatedly positioned within about 0.0005 inch of a desired location.

16. The apparatus of claim 11, wherein said stop surface is mountable at more than one location along said arm.

17. The apparatus of claim 11, wherein said first protuberance has a rounded leading end insertable into one of said first openings.

18. The apparatus of claim 16, wherein each of said first openings is defined by a hemispherical-type dimple formed in said first shaft.

19. The apparatus of claim 11, wherein said first protuberance and said first openings are formed with sufficient precision to enable said stop surface to be repeatedly positioned within about 0.0005 inch of a desired location.

20. The apparatus of claim 11, said apparatus further comprising:

a mounting block mountable to a work piece securing mechanism and having an aperture formed therethrough, said first shaft being disposed through said aperture and extendable out from said mounting block;

at least one set collar mounted on said mounting block for securing said first shaft at a desired position out from said mounting block; and a fastener mounted on said mounting block for allowing said first shaft to be rotated about its longitudinal axis and secured at a desired angular orientation in said aperture.

* * * * *